United States Patent
Sullivan (10) Patent No.: US 10,140,702 B2
(45) Date of Patent: Nov. 27, 2018

(54) IMAGE PROCESSING OF DENTIN TUBULES

(71) Applicant: Colgate-Palmolive Company, New York, NY (US)

(72) Inventor: Richard Sullivan, Atlantic Highlands, NJ (US)

(73) Assignee: Colgate-Palmolive Company, New York, NY (US)

(*) Notice: Subject to any disclaimer, the term of this patent is extended or adjusted under 35 U.S.C. 154(b) by 291 days.

(21) Appl. No.: 15/027,063

(22) PCT Filed: Oct. 4, 2013

(86) PCT No.: PCT/US2013/063431
§ 371 (c)(1),
(2) Date: Apr. 4, 2016

(87) PCT Pub. No.: WO2015/050558
PCT Pub. Date: Apr. 9, 2015

(65) Prior Publication Data
US 2016/0232666 A1    Aug. 11, 2016

(51) Int. Cl.
*G06T 7/00* (2017.01)
*G06T 7/11* (2017.01)
*G06T 7/155* (2017.01)
*G06T 7/194* (2017.01)
*G06T 7/136* (2017.01)

(52) U.S. Cl.
CPC ............ *G06T 7/0012* (2013.01); *G06T 7/11* (2017.01); *G06T 7/136* (2017.01); *G06T 7/155* (2017.01); *G06T 7/194* (2017.01); *G06T 2207/10056* (2013.01); *G06T 2207/10061* (2013.01); *G06T 2207/30036* (2013.01)

(58) Field of Classification Search
CPC ......... G06T 7/0012; G06T 7/11; G06T 7/136; G06T 7/155; G06T 7/194; G06T 2207/10056; G06T 2207/10061; G06T 2207/30036
See application file for complete search history.

(56) References Cited

U.S. PATENT DOCUMENTS

| | | | |
|---|---|---|---|
| 8,044,996 B2 * | 10/2011 | Rice | A61B 5/0059 348/50 |
| 8,351,720 B2 * | 1/2013 | Majewicz | G06T 5/40 382/237 |
| 8,406,554 B1 | 3/2013 | Saha et al. | |

(Continued)

FOREIGN PATENT DOCUMENTS

| CN | 101777117 A | 7/2010 |
|---|---|---|
| CN | 101789075 A | 7/2010 |

(Continued)

OTHER PUBLICATIONS

"Coding experiments:algorithm to determine image contrast," Jan. 24, , Retrieved from Internet: http://coding-experiments.blogspot.com/2011/01/algorithm-to-determine-image-contrast.html.

(Continued)

*Primary Examiner* — Edward Park (57) ABSTRACT

Provided herein is a method of quantifying dentin tubules in a dentin surface. Also provided are uses of the method and a computer program which performs the method.

19 Claims, 6 Drawing Sheets

(56) References Cited

U.S. PATENT DOCUMENTS

2009/0092562 A1  4/2009  Wang et al.
2012/0087587 A1  4/2012  Kacher

FOREIGN PATENT DOCUMENTS

JP    2013-105245 A   5/2013
RU    2467739         11/2012

OTHER PUBLICATIONS

"Leveling" OrginLab, Retrieved Jan. 17, 2013 from Internet: http://www.orginlab.com/index.aspx?go=Products/Original/DataAnalysis/Imageprocessing/.

Ciocca et al., "A new method for quantitateive analysis of dentinal tuules," Computers in Biology and Medicine, Jan. 2007, 37(3):277-286.

DeDeus et al., "Co-site digital optical microscopy and image analysis: an approach to evaluate the process of dentine demineralization," International Endodontic Journal, Jun. 2007, 40(6):441-452.

International Search Report & Written Opinion for International Application No. PCT/US2013/063431 dated Jun. 27, 2014.

Malkusch, "Fundamentals and Problem-solving sequences of quantitative image analysis garbage in means garbage out," Promotive Communication Inc., Jan. 2000, pp. 1-3, Retrieved from Internet: http:/www.carl-zeiss-optronics.de/C1256F8500454979/0/08799895F759F760C1256F8E00355CE2/$file/biofocus.pdf.

Paciornik et al., "In situ atomic force microscopy and image analysis of dentine submitted to acid etching," Journal of Microscopy, Mar. 2007, 225(3):236-243.

Anonymous, 2006, "bwareaopen: Remove small objects from binary image" MATLAB bwareaopen—MathWorks Deutschland, http://de.mathworks.com/help/images/ref/bwareaopen.html?searchHighlight=bwareaopen&s_tid=doc_srchtitle.

Anonymous, 2009, "Matlab, Image processing toolbox tutorial," pp. 12-21.

\* cited by examiner

IMAGE PROCESSING OF DENTIN TUBULES

BACKGROUND

Hypersensitive teeth can cause pain and discomfort when subjected to changes in temperature, pressure or chemical action. Exposure of the dentin frequently leads to hypersensitivity. Dentin exposure may occur due to recession of the gums, periodontal disease or improper dental care. The exposed dentin surface contains channels or tubules that lead to the nerves within the pulp of the tooth. These tubules are filled with fluid. When exposed to external stimuli, the fluid within the tubules contracts or expands. This fluid movement triggers an instantaneous pain response, resulting in dentin hypersensitivity.

One approach to relieving dentin hypersensitivity is to block or occlude the dentin tubules through the use of occlusion agents, thereby preventing the external stimuli from reaching the dentin fluid. In order to determine the efficacy of occlusion agents, it is necessary to be able to quantify dentin tubules and assess the occlusion of dentin tubules.

Dentin tubules typically range from two to ten microns in diameter. Therefore, relatively high magnification microscopic techniques such as scanning electron microscopy (SEM), atomic force microscopy, or optical (for example, confocal) microscopy are typically used to visualize dentin tubules and the relative amount of dentin tubule occlusion. The images of the dentin surface that are obtained from an SEM or confocal microscope enable a qualitative assessment of the degree of tubule occlusion.

However, quantification of dentin tubule occlusion has been challenging. It is known to use visual scoring techniques to semi-quantify dentin tubules and tubule occlusion, but such techniques are highly subjective and inaccurate. Furthermore, quantification of dentin tubules through use of image analysis software has not been successful due to the non-homogeneity of dentin surfaces.

There is therefore the need to provide a method of accurately quantifying dentin tubules and assessing dentin tubule occlusion.

SUMMARY

The present invention aims at least partially to meet these needs in the art.

In a first aspect, the present invention provides a method of quantifying dentin tubules in a dentin surface comprising:
a) providing an image of a dentin surface comprising dentin tubules, the intertubule space, and surface imperfections residing in the intertubule spaces, wherein the image is comprised of a distribution of pixel intensities that are represented by two histograms, one representing the majority of pixel intensity distribution (major histogram), and the other representing the minor pixel intensity distributions (minor histogram). (The major histogram represents the intertuble spaces. The minor histogram is comprised of the lower intensity pixels which represent the dentin tubules and irregular dentin surface imperfections residing in the intertubule space. Pixels associated with random noise are associated with each histogram.)
b) binarizing the major and minor histograms and selecting a threshold light intensity value above the minor histogram and below the major histogram to obtain a first data set at or below the threshold light intensity and a second data set above the threshold light intensity. (This effectively separates the image into one data set comprising of pixels associated with the tubules, irregular surface imperfections and random noise, residing in the intertubule spacing (minor histogram) and the intertubule space (major histogram). The binarization procedure extracts the dentin tubules and surface imperfections from the intertubule space.)
c) linking and filling the adjacent pixels associated in the minor histogram to create one individual measured point (grains or particles) for each group of adjacent pixels to separate pixels associated from the dentin tubules from those associated with irregular dentin surface imperfections and random noise. (Performing such a procedure creates grains or particles of varying sizes and shapes.)
d) obtaining a third data set representing the dentin tubules on the dentin surface by creating a threshold based on a particle parameter, wherein particles below the particle parameter threshold, which include particles from irregular dentin surface imperfections and random noise, are filtered from the image. (The filtering leaves those particles associated with the dentin tubules intact. In one embodiment of the invention, the particle parameter is particle area. Alternatively, thresholding can be performed using such variables, but not limited to, particle diameter, radius, perimeter, and roundness.)

Optionally, the image is obtained from, but not limited to, a confocal microscope, an atomic force microscope, a scanning electron microscope, or a scanned copy of any of the above. Further optionally, the method is computer-implemented. Still further optionally, the data comprise pixels. In some embodiments, the data representing the image are provided in three-dimensions.

Preferably, the region of interest on the dental surface consists of the third data set representing the dentin tubules created by threshold filtering of the minor histogram of the pixel intensity distribution of the entire image.

Optionally, the image is flattened prior to processing the data representing the image. Preferably, the image is flattened using a levelling algorithm which performs a three-point method, a planar method, or a partial planar method.

In a second aspect, the present invention provides a use of the method defined herein to quantify dentin tubule occlusion. Optionally, the dentin tubule occlusion is quantified by determining one or more parameters selected from: the total number of open tubules, the percentage of the total image area covered by open tubules, the number of open tubules per unit surface area of the image, the average tubule diameter, the average tubule radius, and the average tubule circumference. Preferably, the dentin tubule occlusion is quantified by the percentage of the total image area covered by open tubules, and optionally, one or more parameters selected from the total number of open tubules, the number of open tubules per unit surface area of the image, the average tubule diameter, the average tubule radius, and the average tubule circumference.

In a third aspect, the present invention provides a use of the method defined herein to determine the occlusive performance of a dentifrice composition. Preferably, the use comprises comprising quantifying dentin tubule occlusion, before and after application of the dentifrice composition to the surface of a tooth comprising dentin, or a portion thereof, wherein the dentin tubule occlusion is quantified by determining one or more parameters selected from: the total number of open tubules, the percentage of the total image area covered by open tubules, the number of open tubules per unit surface area of the image, the average tubule diameter, the average tubule radius, and the average tubule circumference.

In a fourth aspect, the present invention provides a computer program, which when run on a computer-controlled system, performed a method as defined herein.

The present inventors have found that the method of the present invention allows an accurate and reproducible quantification of dentin tubules without interference from the inhomogeneity associated with the dentin surface. The present invention overcomes the subjectivity associated with visual scoring techniques. Furthermore, due to the accuracy and reproducibility of the method, the method may further be used to asses and quantify dentin tubule occlusion, and assess the efficacy of a dentifrice composition in promoting dentin tubule occlusion.

Further embodiments of the invention will be apparent from the detailed description and the Examples.

DETAILED DESCRIPTION

It should be understood that the detailed description and specific examples, while indicating embodiments of the invention, are intended for purposes of illustration only and are not intended to limit the scope of the invention.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

In some embodiments, the present invention provides a method of quantifying dentin tubules in a dentin surface comprising:
a) providing an image of a dentin surface comprising dentin tubules,
b) binarizing data representing the image into first data at or below a threshold light or pixel intensity, and second data above the threshold light or pixel intensity, and
c) eliminating random noise and surface irregularities in the image not associated with the tubules from the first or second data to isolate third data representing the dentin tubules in a region of interest.

Figure 1A:
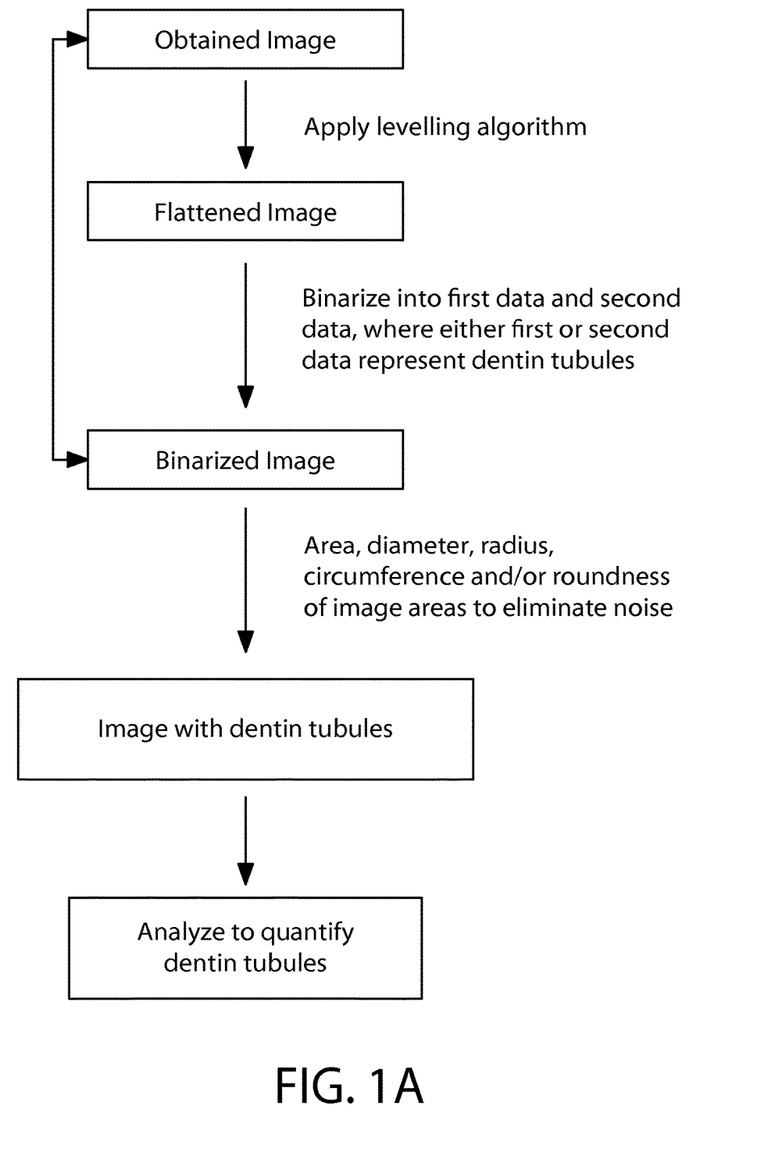
FIG. 1A is a flow chart illustrating the method of quantifying dentin tubules according to an embodiment of the present invention.

An overview of the method of the present invention is provided in the flow chart of FIG. 1A. Sample SEM images representing the stages of the process defined in FIG. 1A are provided in FIG. 1B.

The term 'quantifying dentin tubules' relates to a measurement of a parameter of dentin tubules in the image. Such parameters include, but are not limited to, the total number of tubules or open tubules, the number of tubules or open tubules per unit area, the total area of dentin surface covered by tubules or open tubules as a percentage of total image area, the diameter, radius, and circumference of the tubules, the density of the tubules, and the roundness of the tubules.

Typically, the method is computer-implemented. In one embodiment, the method is performed using Leica Maps® software. However, other imaging analysis software may be used.

Image

Methods of acquiring images of a dentin surface would be known to the skilled person. Typically, the image is derived from an extracted tooth or a portion thereof. Preferably, the image is obtained by confocal microscopy, atomic force microscopy, or scanning electron microscopy. Images may also be acquired by digitizing images from hard copies of images from obtained by confocal microscopy, atomic force microscopy, or scanning electron microscopy. The image may be two-dimensional or three-dimensional. In one embodiment, an acquired two-dimensional image may be converted into a three-dimensional image. In one embodiment, a scanned image may be used in the methods according to the present invention. The image may be in color or grayscale and is not limited to any particular resolution.

Typically, the image has a file format selected from JPEG. TIFF, RAW, GIF, BMP, PNG, PPM, PGM, PBM, PNM, PFM, PAM or WEBP. Preferably, the image has a TIFF file format.

In one embodiment, the obtained image is flattened prior to binarization. Flattening advantageously corrects for any irregularities in the background. Optionally, the image is flattened using a levelling algorithm which performs a three-point method, a planar method or a partial planar method. Other methods of flattening images would be known the skilled person.

Binarizing Data

In one arrangement, the image is binarized. In the present invention, a binarized image typically has only two possible intensity or color values for each pixel. Typically the two colors used for the binary image are black and white, although any two colors may be used.

Typically, the image, or more specifically, the data representing the image, is binarized on the basis of light intensity. A threshold light intensity is selected, and the data representing the image is divided into two categories: the first category comprising data having a light intensity above the threshold light intensity (first data) and the second category comprising data having a light intensity below the threshold light intensity (second data).

The data representing the image may comprise any controllable element of the image. Typically, the data comprise or consist of pixels. In other embodiments, the data may comprise or consist of dots or lines. Thus in a preferred embodiment, the pixels constituting the image are divided into two categories: the first category comprising pixels having a light intensity above the threshold light intensity (first data) and the second category comprising pixels having a light intensity below the threshold light intensity (second data).

In one embodiment, binarizing the data representing the image comprises determining the distribution of light intensity in the obtained image, for example, in the form of a histogram. Typically, a threshold light intensity is determined from the distribution so that either the first data or the second data represent the dentin tubules. This enables an initial separation of the data representing the dentin tubules from the data representing dentin surface.

In a preferred embodiment, the distribution of pixel intensity is determined. The image of the dentin surface contains pixels of varying degrees of intensity. The intensity typically falls into two main distributions. The minor proportion of pixels have a relatively low intensity. These pixels represent the dentin tubules as well as other low intensity points on the dentin surface. The major proportion of pixels have a relative high intensity. These pixels are associated with the dentin surface in between the dentin tubules (inter-dentin tubule space). However, in cases where the light contrast of the image or the grayscale has been inverted, the minor proportion of pixels representing the dentin tubules as well as other low intensity points on the dentin surface may have a relatively high intensity, whilst the major proportion of pixels representing the dentin surface may have a relatively low intensity.

The threshold intensity is typically selected so that the pixels representing the dentin tubules fall on one side of the threshold, but not on the other side.

As mentioned above, the acquired image data may be three-dimensional or converted into three-dimensions. This is further illustrated in FIG. 1B. When the image data are visualised in three-dimensions, a threshold intensity effectively separating the data representing the dentin tubules from the data representing the dentin surface, may be more accurately selected. In some embodiments, a three-dimensional image is generated by converting the data representing the image prior to binarizing the data, and optionally, after flattening the image.

Typically, in order to achieve binarization, the first data or second data representing the dentin tubules (typically pixels), are grouped. Typically, the grouping comprises adjusting the light intensity of the first or second data representing the dentin tubules to a selected intensity. As a result of this adjustment, the first data or the second data representing the dentin tubules, acquire a single, constant light intensity. This operation allows the tubules to be represented as single grains, particles or image areas on the image instead of a compilation of individual light intensities (or pixels having individual light intensities). When the data comprise or consist of pixels, typically, the minor proportion of pixels which are associated with the dentin tubules are be grouped.

In some embodiments, the light intensity that is selected for the grouping operation is the maximum light intensity of the data representing the dentin tubules that is observed in the light intensity distribution. However, any light intensity may be selected for the grouping operation, so long as it is distinguished from the background or dentin surface (see below).

In some embodiments, the grouping is performed by using a fill function. In some embodiments, the fill function links all adjacent pixels of equal intensity to create a larger particle or grain from the adjoined pixels.

After the grouping operation is performed, the background (i.e. the data representing the dentin space and excluding the tubules) is rendered uniform, also having a constant light intensity. In some embodiments, the dentin surface has already been rendered uniform through the binarization process. In some embodiments, all of the pixels associated with major histogram are set equal to the same value through binarization. In some embodiments, the points above the threshold value are set as background and the points below (the minor histogram) are set as measurable points. In some embodiments, the selected light intensity of the data representing the dentin space may be any light intensity that distinguishes the data representing the dentin surface from the data representing the dentin tubules, to achieve binarization. In a preferred embodiment black and white are used as the binary image colors.

Eliminating Noise

Figure 1B:
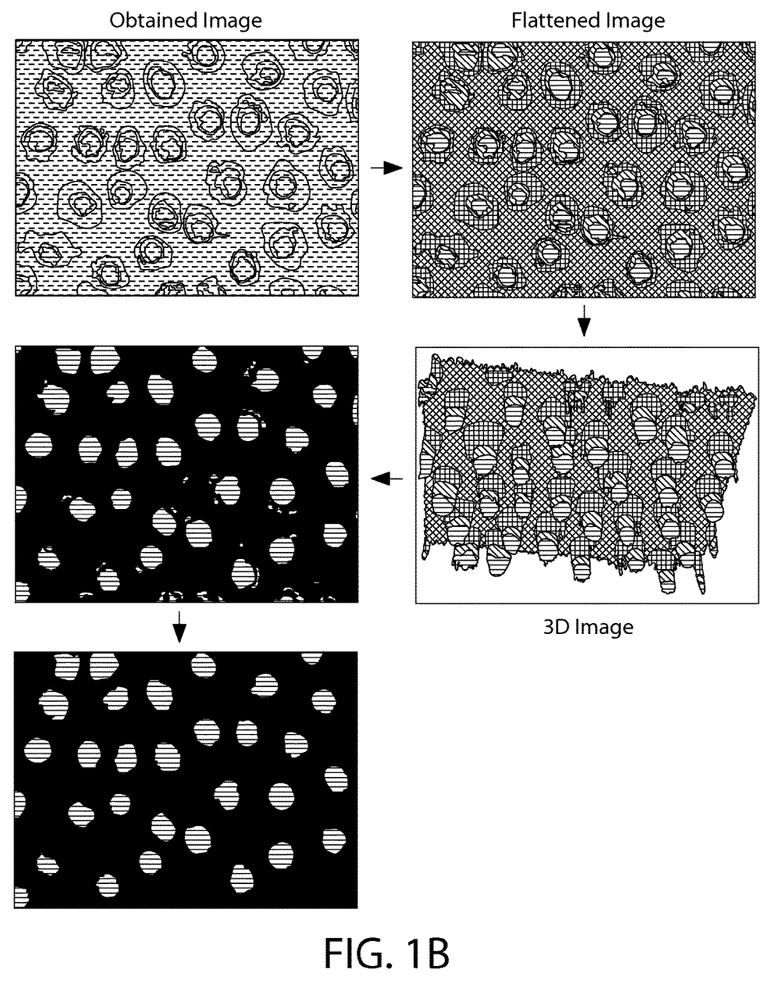
FIG. 1B illustrates scanning electron microscope (SEM) images of a dentin surface processed according to an embodiment of the present invention.

As can be seen from the exemplary binarized image of FIG. 1B (labeled 'binarized image with 'noise and irregularities in the intertubule space''), after the grouping operation is performed as described above, the grains, particles or image areas representing the dentin tubules are clouded by 'noise' and and irregularities in the intertubule space'. The larger grains, particles or image areas are associated with the dentin tubules, whilst the smaller grains, particles or image areas are the 'noise' and irregularities in the intertubule space'.

The 'noise' and irregularities in the intertubule space arises due to the random sources and the inhomogeneous nature of the dentin surface and represents points on the dentin surface having a similar light intensity to the dentin tubules. Due to the overlap in light intensities, the binarization step does not allow for a separation of the data representing the dentin tubules from the data representing these other points on the dentin surface.

In order to achieve accuracy and reproducibility of the dentin tubule quantification, it is necessary to eliminate the noise and irregularities in the intertubule space and make the dentin tubules the region of interest. Typically, the elimination of noise comprises removing data representing the dentin surface from the first or second data (whichever represent the dentin tubules), to obtain third data representing dentin tubules without noise and irregularities in the intertubule space, in a region of interest. Preferably, the region of interest consists of the dentin tubules.

Typically, thresholding is used to remove the grains or image areas that are not associated with dentin tubules. The thresholding criteria may be selected from the area, diameter, radius, circumference and roundness of the grains or image areas represented by the first or second data, whichever are associated with the dentin tubules. Thus, for example, grains or image areas having an area, diameter, radius, circumference and/or extent of roundness that is smaller than a threshold level, can be eliminated.

One or more thresholding criteria may be used. When more than one criteria are used, the image may be subjected to more than one thresholding steps, either in succession, or in simultaneous fashion.

The threshold level is set on the basis of the observed dentin tubules, as represented by the first or second data. Thus, for example, the threshold diameter may correspond to the average diameter of the dentin tubules observed in the image such that any grains or image areas having a diameter below this threshold, are eliminated. Once the 'noise' and irregularities in the intertubule space has been eliminated, the dentin tubules form the region of interest. The dentin tubules may then be accurately and reproducibly quantified. For example, any one or more of the following parameters may be measured to quantify dentin tubules: the total number of tubules or open tubules, the percentage of the total image area covered by tubules or open tubules, the percentage of the total number of tubules that are open, the number of tubules or open tubules per unit surface area of the image, the average tubule diameter, the average tubule radius, the average tubule circumference, the density of the tubules, and the roundness of the tubules. In some embodiments, roundness is assessed by calculating how far a shape deviates from the shape of a circle. In some embodiments, an algorithm calculates roundness by measuring the radius of the particle at set intervals and comparing that radius to that of a perfect circle.

Use of the Methods

In another arrangement, the method of the present invention, as defined herein, is used to quantify dentin tubule occlusion. Typically, the parameters used to quantify dentin tubule occlusion are selected from: the total number of tubules or open tubules, the percentage of the total image area covered by tubules or open tubules, the percentage of the total number of tubules that are open, the number of tubules or open tubules per unit surface area of the image, the average tubule diameter, the average tubule radius, the average tubule circumference, the density of the tubules, and the roundness of the tubules.

In a preferred embodiment, dentin tubule occlusion is quantified using at least two of the aforementioned parameters to improve accuracy. Thus, dentin tubule occlusion may be quantified by determining the percentage of the total image area covered by open tubules, in conjunction with one or more of the other aforementioned parameters.

Typically, the greater the occlusion, the smaller the number of open tubules per unit area and the total number of open tubules, the smaller the percentage of the total image area covered by open tubules, and the smaller the average tubule diameter, average tubule radius, average tubule circumference, density and larger deviation from roundness of the tubules.

Typically dentin tubule occlusion is quantified by analysing an image of a test sample and an image of a control sample or a reference sample.

In another arrangement, the method of the present invention, as defined herein, is used to determine the efficacy of an oral care composition, and in particular, to determine occlusive performance of an oral care composition.

The efficacy of the oral care composition, and specifically, the occlusive performance of the oral care composition may be determined by quantification of dentin tubule occlusion as defined herein, before and after application of the oral care composition to the surface of a tooth, or a portion thereof, comprising dentin. Typically, the oral care composition is applied to the tooth or a portion thereof, by brushing, for a period of time ranging from thirty seconds to two minutes. After brushing, the tooth or a portion thereof, is rinsed with water. The cycle of brushing and rinsing may be repeated up to ten times. Alternatively, the oral composition may be applied to the dentin surface without brushing The dentin sample is wetted with a small amount of PBS buffer, then a small amount of oral composition is applied to the dentin surface and mixed with the PBS by gently brushing the entire surface using a camel hair brush. The dentin samples are left undisturbed for fifteen minutes at room temperature. After this, the dentin samples are placed in ajar containing 30 ml of PBS buffer, where they remain for fifteen minutes while stirring. The samples are then swished back and forth to ensure removal of any oral composition from the surface. This procedure can be repeated multiple times to monitor the progression of occlusion as a function of application of the oral composition. Dentin tubule occlusion as defined herein may be quantified before and after the repeated brushing and rinsing cycles.

Typically, the tooth or a portion thereof, is a dentin disk.

The oral care composition may be selected from a dentifrice, a mouthwash, a chewing gum, or any other topical composition.

Figure 2:
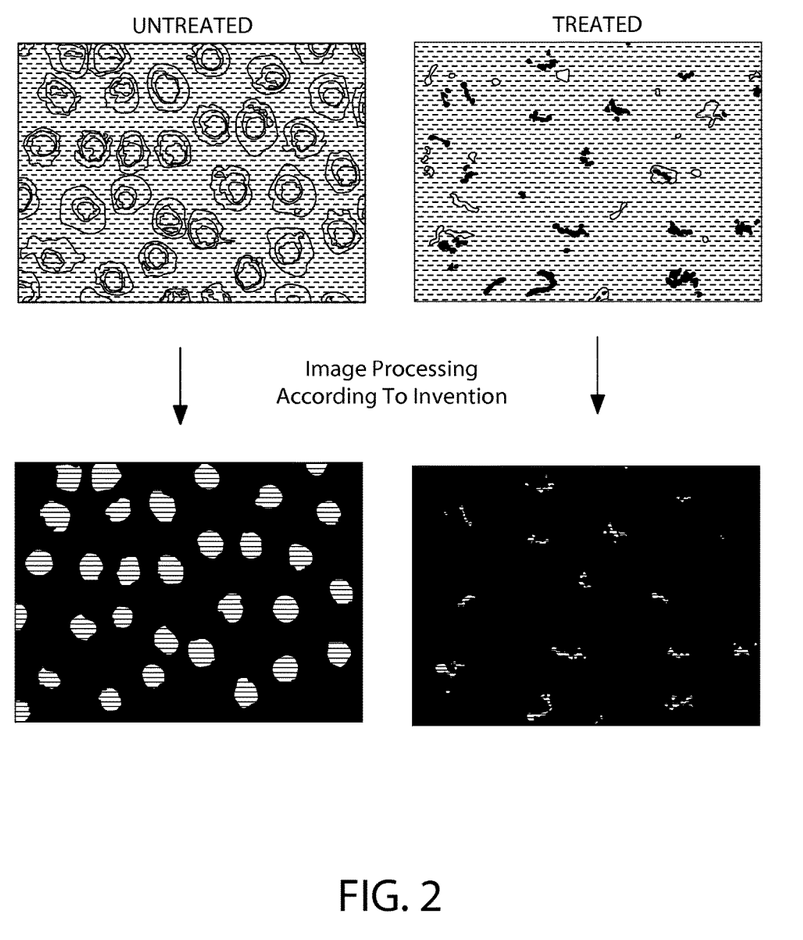
FIG. 2 illustrates images of a dentin surface processed according to an embodiment of the present invention before and after treatment with a dentifrice.

FIG. 2 illustrates sample SEM images of dentin disks before and after treatment with a dentifrice composition, which have been processed according to the present invention. As can be seen in this Figure, after treatment, the total number of open tubules, the number of open tubules per unit area and the diameter of the tubules is significantly decreased, indicating effective tubule occlusion.

Computer Program

In yet another arrangement, the present invention provides a computer program, which when run on a computer-controlled system, performs a method as described herein.

Figure 3:
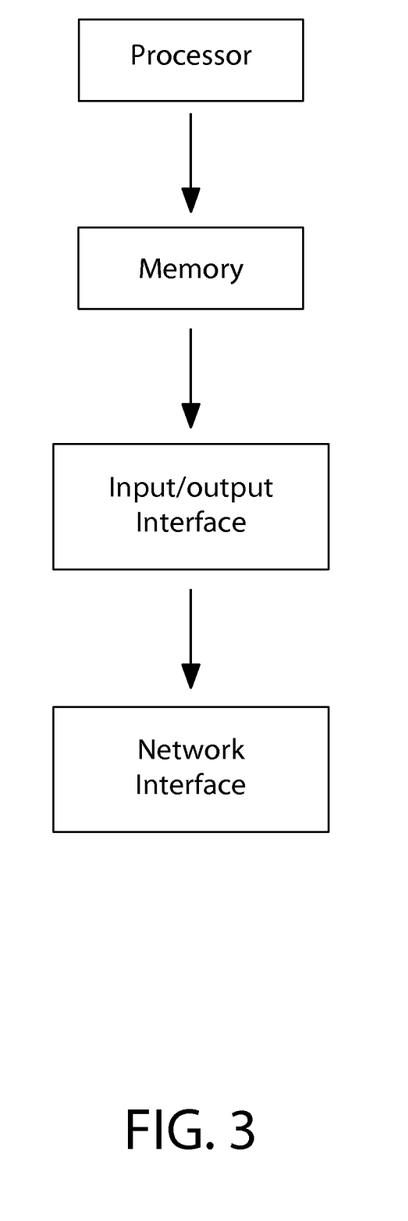
FIG. 3 is a block diagram illustrating the components of an exemplary computer system.

FIG. 3 is a block diagram illustrating basic components of an exemplary computer system on which the computer program may be run. It will be appreciated that other computer systems that have fewer components or more components may also be used with the present invention. The computer system may be implemented with a conventional architecture and may be in a desktop computer, laptop or handheld computing device such as a tablet computer. Typically, the apparatus includes components such as a processor that is in communication with a memory, and an input/output interface connected to a display, and typically at least one other control device such as a mouse and keyboard. The components are operatively coupled via a local interface (not shown), which can be, for example, one or more buses or other wired or wireless connections. The memory can include any one or a combination of volatile memory elements (e.g. random access memory elements (RAM, such as DRAM, SRAM, SDRAM, etc.)) and non-volatile memory elements (such as ROM, flash memory, hard disks, etc.) to provide fixed and working data storage for the processor.

The computer program is stored in the memory and is implemented by suitable computer program code (not shown) which, when executed by the processor, causes the computer system to provide the functionality described herein.

A microscope as described above may be connected to the input/output interface so that images to be processed can be stored directly onto the memory. Alternatively, the image to be processed may be provided to the memory via a data input device connected to the input/output interface, or via the network interface.

Alternatively, the functionality required to carry out the steps of embodiments may, instead of being implemented solely in computer program code, be implemented in dedicated processing equipment or a mixture of dedicated hardware and software.

The invention is further illustrated in the following non-limiting Examples.

EXAMPLES

Example 1: Quantification of Dentin Tubles

Table 1 illustrates an analysis of the processed SEM image of FIG. 1B (bottom left) which has been produced in accordance with the present invention. The analysis was performed using Leica Map DCM 3D 6.1.0.5940 software.

TABLE 1

| | |
|---|---|
| Number of grains | 31 |
| Total area occupied by the grains | 125772 mm$^2$ |
| % total image area occupied by grains | 15.9928% |
| Density of grains | 3.94185e$^{-005}$/mm$^2$ |
| Area of an individual grain | 4057.18 mm2 ± 948.793 mm$^2$ |
| Equivalent Diameter of an individual grain | 71317.8 μm ± 8917.53 μm |
| Mean Diameter | 70602.0 μm ± 8972.78 μm |
| Roundness | 0.755929 ± 0.0871665 |

Example 2: Determining the Occlusive Performance of a Dentifrice Composition

A dentin disk was prepared from a human molar. An image of the dentin disk was obtained using a confocal microscope. After flattening using a levelling algorithm, the distribution of pixel light intensity was determined. A threshold light intensity was selected such that pixels having a light intensity below the threshold were associated with the dentin tubules and pixels having a light intensity above the threshold were associated with the dentin surface. The image is binarized to create two data sets: one above and one below the intensity threshold. The pixels falling below the intensity threshold comprise of the dentin tubules, noise, and surface irregularities. The pixels falling above the threshold comprise of the intertubule spaces and are assigned as background. The fill function is used to group adjoining pixels falling below the threshold to form individual particles or grains of varying sizes and shapes.

The image was subsequently subjected to thresholding on the basis of the area of the grains to separate grains associated with the tubules from those associate with random noise and surface irregularities.

Quantification of dentin tubule occlusion was performed by determining the total number of open tubules, the percentage of surface area covered by open tubules, and the mean diameter of the tubules.

The dentin disk was then subjected to seven brush/rinse cycles with a dentifrice composition. After treatment, a further confocal microscope image was taken of the disk. The image was processed in the same way as described above, and dentin tubule occlusion was quantified as described above.

Figure 4:
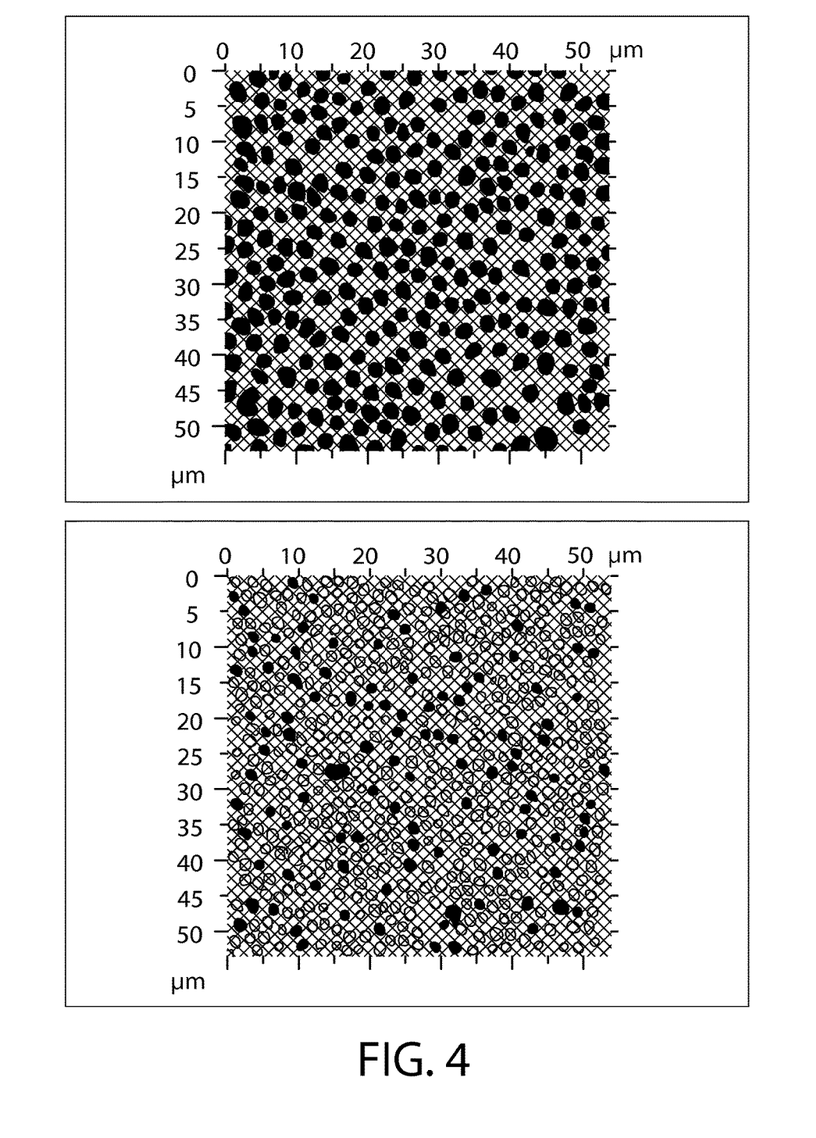
FIG. 4 is a confocal microscope image of a dentin disk that has been processed according to the present invention prior to treatment (left) and after treatment (right) with a dentifrice that occludes dentin tubules.

The results are illustrated in FIG. 4. The image on the left represents the dentin disk before treatment and the image on the right represent the dentin disk after treatment.

Table 2 below indicates the quantitative information obtained from the image analysis.

TABLE 2

|  | Before treatment (FIG. 4; left image) | After treatment (FIG. 4; right image) |
| --- | --- | --- |
| Number of Open Tubules | 270 | 158 |
| % area covered by open tubules | 33.4 | 3.2 |
| Mean diameter of tubules (μm) | 2.07 | 0.68 |

As can be seen from FIG. 4 and Table 2, there is a significant decrease in the total number of open tubules, the percentage area covered by open tubules and the mean diameter of the tubules after brushing, indicating successful occlusion. The accuracy of the assessment of dentin occlusion is increased by reporting the three parameters (i.e. total number of open tubules, the percentage area covered by open tubules and the mean diameter of the tubules) in conjunction with each other.

Example 3—Effects of Brushing on Dentin Tubule Occlusion (I)

An SEM image of a dentin disc which had been brushed with a dentifrice composition with occluding activity, was also obtained. The image was processed as described in Example 1. The processed image is illustrated in FIG. 5.

Figure 5:
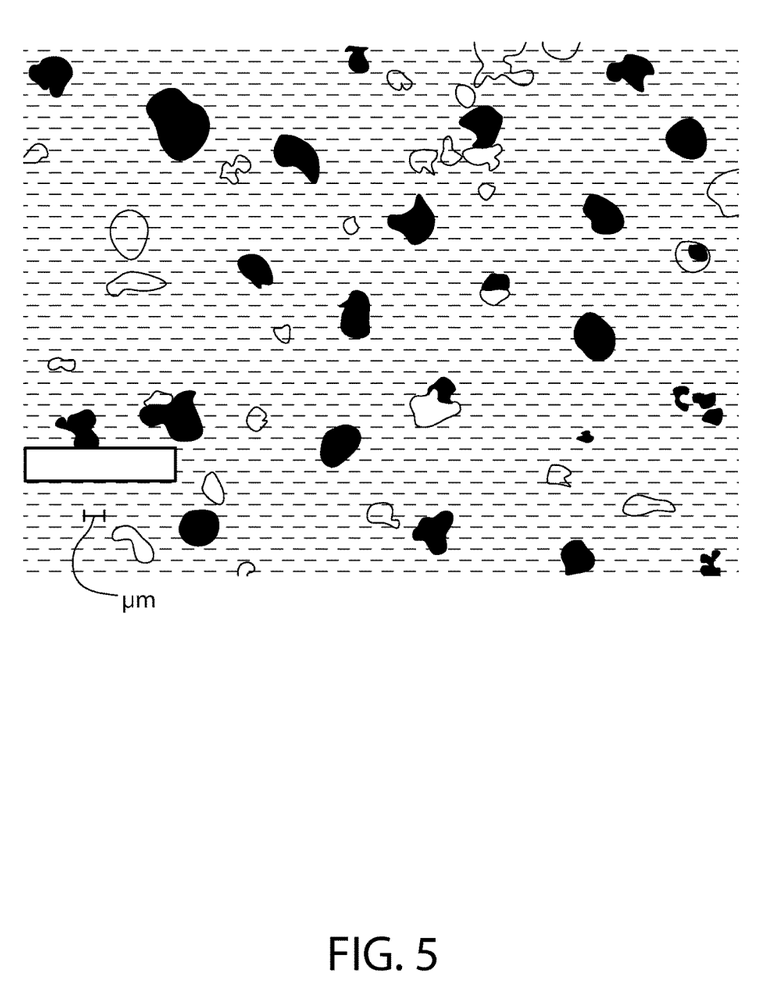
FIG. 5 is an SEM image of a dentin disk that has been treated with a dentifrice that has partially occluded dentin tubules.

The image of FIG. 5 illustrates that whilst some dentin tubules are closed or occluded, others are open or partially filled. The percentage of surface area covered by open tubules is an appropriate parameter for assessing the occlusive performance of a dentifrice product. In FIG. 5, the percentage of surface area covered by open tubules is 2.74%.

Example 4: Effects of Brushing on Dentin Tubule Occlusion (II)

Table 3 illustrates an analysis of the processed SEM images of FIG. 2 which have been produced in accordance with the present invention. The images represent dentin disks before and after brushing with a dentifrice composition.

TABLE 3

|  | Before Treatment | After treatment |
| --- | --- | --- |
| % area occupied by open tubules | 16% | 0.67% |
| % tubules that are open | 100% | 4.2% |
| % tubules that are occluded | 0% | 95.8% |

As can be seen from Table 3, after treatment, percentage area occupied by open tubules and the percentage of the total number of tubules that are open decreased with treatment, whilst the percentage of the total number of tubules that are occluded, increased with treatment. These data illustrate a good occlusive performance of the dentifrice composition.

Whilst particular embodiments of the invention have been illustrated and described, it will be obvious to those skilled in the art that various changes and modifications may be made without departing from the scope of the invention as defined in the appended claims.

The invention claimed is:

1. A method of quantifying dentin tubules in a dentin surface comprising:
   a) providing an image of a dentin surface comprising dentin tubules, the intertubule space, and surface imperfections residing in the intertubule spaces,
      wherein the image is comprised of a distribution of pixel intensities that are represented by two histograms, one representing the majority of pixel intensity distribution (major histogram), and the other representing the minor pixel intensity distributions (minor histogram)
      wherein the major histogram represents intertubule spaces on the dentin surface and the minor histogram represents the dentin tubules and irregular dentin surface imperfections residing in the intertubule space;
   b) binarizing the major and minor histograms and selecting a threshold light intensity value above the minor histogram and below the major histogram to obtain a first data set at or below the threshold light intensity and a second data set above the threshold light intensity;
   c) linking and filling the adjacent pixels associated in the minor histogram to create one individual measured grain for each group of adjacent pixels to separate pixels associated from the dentin tubules from those associated with irregular dentin surface imperfections and random noise; and
   d) obtaining a third data set representing the dentin tubules on the dentin surface by creating a threshold based on a particle parameter, wherein particles below the particle parameter threshold, which include particles from irregular dentin surface imperfections and random noise, are filtered from the image.

2. The method of claim 1, further comprising the step of assigning the data set representing the intertubule space as background.

3. The method of claim 1, wherein the region of interest consists of the third data set representing the dentin tubules.

4. The method of claim 1, wherein the third data set comprises a plurality of grains.

5. The method of claim 4, wherein the grains are of varying size and shape.

6. The method of claim 1, wherein the noise and surface irregularities are eliminated using one or more parameters selected from: the area, diameter, radius, circumference and roundness of image areas represented by the third data set.

7. The method of claim 1, wherein binarizing the data comprises determining the distribution of pixel light intensity in the obtained image, and determining a threshold light intensity from the distribution so that either the first data or the second data represent the dentin tubules.

8. The method of claim 7, wherein binarizing the data comprises adjusting the light intensity of the first or second data to a selected light intensity.

9. The method of claim 8, wherein the selected light intensity is the maximum light intensity of the data representing the dentin tubules, observed in the distribution.

10. The method of claim 8, wherein the light intensity is adjusted using a fill function.

11. The method of claim 1, wherein the image is flattened prior to processing the data representing the image.

12. The method according to claim 11, wherein the image is flattened using a levelling algorithm which performs a three-point method, a planar method, or a partial planar method.

13. The method of claim 1, wherein the image is obtained from a confocal microscope or a scanning electron microscope.

14. The method of claim 1, which is computer-implemented.

15. The method of claim 1, wherein the data comprise pixels.

16. The method of claim 1, wherein the data representing the image are provided in three-dimensions.

17. A method of quantifying dentin tubule occlusion in a dentin surface comprising:
a) providing an image of a dentin surface comprising dentin tubules, the intertubule space, and surface imperfections residing in the intertubule spaces,
wherein the image is comprised of a distribution of pixel intensities that are represented by two histograms, one representing the majority of pixel intensity distribution (major histogram), and the other representing the minor pixel intensity distributions (minor histogram)
wherein the major histogram represents intertubule spaces on the dentin surface and the minor histogram represents the dentin tubules and irregular dentin surface imperfections residing in the intertubule space;
b) binarizing the major and minor histograms and selecting a threshold light intensity value above the minor histogram and below the major histogram to obtain a first data set at or below the threshold light intensity and a second data set above the threshold light intensity;
c) linking and filling the adjacent pixels associated in the minor histogram to create one individual measured grain for each group of adjacent pixels to separate pixels associated from the dentin tubules from those associated with irregular dentin surface imperfections and random noise;
d) obtaining a third data set representing the dentin tubules on the dentin surface by creating a threshold based on a particle parameter, wherein particles below the particle parameter threshold, which include particles from irregular dentin surface imperfections and random noise, are filtered from the image; and
e) quantifying dentin tubule occlusion by determining one or more parameters selected from: the total number of open tubules, the percentage of the total image area covered by open tubules, the number of open tubules per unit surface area of the image, the average tubule diameter, the average tubule radius, and the average tubule circumference.

18. The method of claim 17, wherein the dentin tubule occlusion is quantified by determining the percentage of the total image area covered by open tubules, and optionally, one or more parameters selected from the total number of open tubules, the number of open tubules per unit surface area of the image, the average tubule diameter, the average tubule radius, and the average tubule circumference.

19. The method of claim 17, wherein the method is used to determine the occlusive performance of a dentifrice composition.

* * * * *